United States Patent [19]

van Zanten et al.

[11] Patent Number: 4,715,662
[45] Date of Patent: Dec. 29, 1987

[54] METHOD FOR DETERMINING AN OPTIMAL SLIP VALUE

[75] Inventors: Anton van Zanten, Ditzingen; Gerhard Heess, Tamm, both of Fed. Rep. of Germany

[73] Assignee: Robert Bosch GmbH, Stuttgart, Fed. Rep. of Germany

[21] Appl. No.: 768,097

[22] PCT Filed: Dec. 15, 1984

[86] PCT No.: PCT/EP84/00402
§ 371 Date: Aug. 16, 1985
§ 102(e) Date: Aug. 16, 1985

[87] PCT Pub. No.: WO85/02592
PCT Pub. Date: Jun. 20, 1985

[30] Foreign Application Priority Data

Dec. 16, 1983 [DE] Fed. Rep. of Germany ....... 3345546

[51] Int. Cl.$^4$ ................................................ B60T 8/32
[52] U.S. Cl. ........................... 303/109; 303/100; 303/104; 303/DIG. 4; 364/426
[58] Field of Search .............. 303/100, 96, 97, 105, 303/106, 109, 110, 111, 104, DIG. 4; 188/181 A, 181 T, 181 R; 364/426

[56] References Cited

U.S. PATENT DOCUMENTS 3,131,975  5/1964  Smith et al. ..................... 303/104
3,235,036  2/1986  Meyer et al. .................... 303/104
3,663,069  5/1972  Perry et al. ..................... 303/104
3,744,852  7/1973  Riordan ........................... 303/104
4,392,202  7/1983  Matsuda ..................... 303/DIG. 4

FOREIGN PATENT DOCUMENTS

2748863   1/1978  Fed. Rep. of Germany .
1407168   6/1965  France .
0135360  10/1981  Japan .
0040138   3/1982  Japan .

Primary Examiner—John W. Caldwell, Sr.
Assistant Examiner—Alvin Oberley
Attorney, Agent, or Firm—Edwin E. Greigg

[57] ABSTRACT

A method for ascertaining an optimal slip value λ at at least one wheel of a vehicle, in order to be able to regulate the braking force optimally. To this end, at least the wheel speed is measured, and the vehicle speed is ascertained. By varying the braking pressure and the slip during driving, signal combinations for the wheel speed, the vehicle speed, the braking pressure and the tire/road contact force are ascertained and inserted into a given function $V_R(K+1)$. For the resultant equation system, the coefficients $\alpha_n$ can then be ascertained from which the coefficients $a_n$ of a general description of the μ slip curve can be ascertained. With these coefficients $a_n$, the μ slip curve and its maximum, from which the optimal slip λ can then be ascertained, are then clearly defined.

13 Claims, 7 Drawing Figures

METHOD FOR DETERMINING AN OPTIMAL SLIP VALUE

The invention relates to a method for determining an optimal slip value λ of at least one wheel of a vehicle in order to regulate braking force, using signals ($V_R^*$; $V_F^*$) that are at least approximated to the wheel speed $V_R$ and the vehicle speed $V_F$.

In anti-skid braking, the pressure in the wheel cylinder of the regulated wheel is regulated such that the tire slip is as nearly as possible within the range of the maximum coefficient of adhesion in braking. Accordingly, a good estimate of this maximum is a prerequisite for good anti-skid braking regulation. Typically, it is primarily the wheel acceleration that is monitored to this end.

The invention differs from this by ascertaining the μ-slip curve continuously by means of measurements and perhaps estimates of "measured values" and with the aid of mathematical substitution models. Once the course of this curve is known, the position of its maximum is known as well, and then the set-point value for the slip can be determined in accordance with the location of this maximum, possibly taking other parameters into account as well. For instance, when driving straight ahead, the set-point slip value can be set below the maximum by a predetermined small amount or percentage, and this amount or percentage can be increased when cornering, in order to increase lateral guidance.

In the invention, the identification methodology of identification is applied in order to ascertain the slip curve. This methodology is based on measurements and mathematical substitution models of physical processes. The mathematical substitution models here describe (1) the wheel under the influence of braking moment and braking force; (2) the tire as a slip curve; (3) the wheel brake cylinder under the influence of the pressure in the main brake cylinder and switching valve positions; and (4) the vehicle that is decelerated by the braking forces. The pressure in the main brake cylinder and the wheel speed are what is measured. An improvement and simplication of the identification could be attained if the pressure in the wheel brake cylinder and the vehicle speed could be measured. The regulator-controlled switching valve signals can also be used to calculate the brake pressure in the wheel brake cylinder. Based on the measurements and the mathematical models, the identification now furnishes parameter values from which the characteristic values of the slip curve, and hence the slip curve itself, can be determined.

The mathematical models, the identification methodolgy and the preparation (filtering) of the measurement signals are described below. A computer (microcomputer) can be programmed with the aid of the algorithms, in order thereby to determine the slip curve. An exemplary calculation concludes this description.

BRAKE-WHEEL-TIRE SYSTEM

Figure 1:
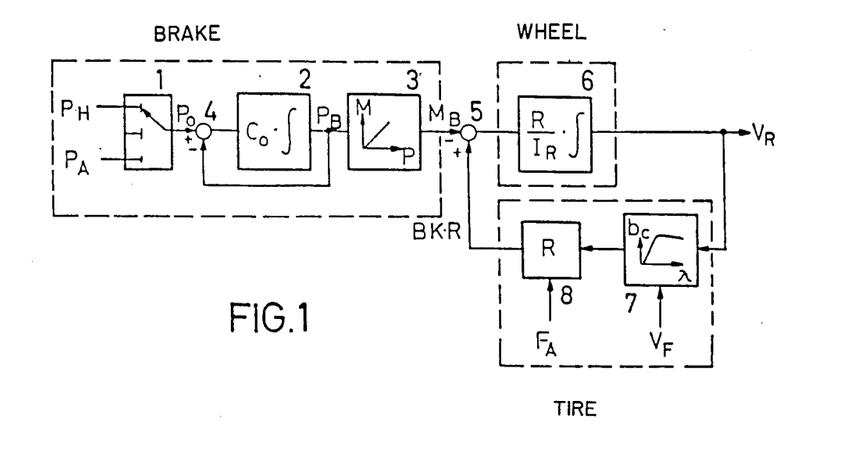
FIG. 1 illustrates a mathematical substitution model for a brake-wheel-tire system.

The mathematical substitution model for this system is sketched in FIG. 1.

The switching valve 1 is controlled by the ABS (anti-skid braking system) regulator not shown, which is well known in the prior art. In the position shown, the wheel brake cylinder 2 is connected to the main brake cylinder, and the pressure in the wheel brake cylinder 2 increases. In the middle position, the line to the wheel brake cylinder is interrupted, and the braking pressure in the wheel brake cylinder remains constant. In the lower position, the wheel brake cylinder communicates with the return line, and the pressure in the wheel brake cylinder decreases. The brake disk or brake drum 3 converts the wheel brake cylinder pressure $P_B$ into a braking moment $M_B$. The mathematical model of the wheel brake cylinder is $$\dot{P}_B = C_o(P_o - P_B)$$

in which $P_o$ is the applied pressure and $C_o$ is a constant.

Hence, this is a first-order (linear) system. The braking moment $M_B$ acts upon the wheel 6, and from the integration, the wheel speed $V_R$ is obtained. A negative feedback is attained via the wheels 7, 8, and the moment BK.R is subtracted from the braking moment. The braking force BK is the product of the coefficient of braking adhesion $b_c$ and the tire/road contact force $F_A$. Using the tire model 7, the coefficient of braking adhesion $b_c$ is calculated from the wheel speed $V_R$ and the vehicle speed $V_F$. The tire/road contact force $F_A$ and the vehicle speed are calculated from the vehicle model. The mathematical model of the wheel is $$\dot{V}_R = \frac{BK \cdot R^2 - M_B \cdot R}{I_R}$$

where
R = tire radius and
$I_R$ = wheel + tire moment of inertia.

Because of the nonlinear braking force, this is a nonlinear differential equation, and the identification is accordingly a nonlinear identification. The coefficient of braking adhesion $b_c$ is modelled as follows:

$$b_c = \epsilon \frac{\lambda}{1 - \lambda} \quad \text{if } \bar{s} < 0.5$$

$$b_c = \mu \left( 1 - \frac{\mu(1 - \lambda)}{4\epsilon\lambda} \right) \quad \text{if } \bar{s} > 0.5$$

where $$\lambda = \text{tire slip} = \frac{V_F - V_R}{V_F}$$

$\epsilon$ = tire constant
$\mu = \mu_o(1 + A_\lambda V_\lambda)$
$\mu_o$ = friction coefficient, tire/road combination
$A_\lambda$ = rubber constant
$V_\lambda = \lambda \cdot V_F$ = loop speed $$\bar{s} = \frac{\epsilon \lambda}{\mu(1-\lambda)}$$

From this model, it can be concluded that the nonlinearity $b_c(\lambda)$ is inertia-free. The nonlinear identification can therefore be carried out using the methods of the linear identification. To this end, the tire model is written as follows:

$$b_c = \epsilon \frac{V_F - V_R}{V_R} \text{ if } \bar{s} < 0.5$$

$$b_c = \mu_0 + \mu_0 A \lambda (V_F - V_R) - \frac{\mu_0^2}{4\epsilon} \frac{V_R}{V_F - V_R} -$$

$$\frac{\mu_0^2 A \lambda}{2\epsilon} V_R - \frac{\mu_0^2 A^2 \lambda}{4\epsilon} \{V_R(V_F - V_R)\} \text{ if } \bar{s} > 0.5$$

Simulations have shown that the first three terms are sufficient for the range of interest, that is, around the maximum of the slip curve, if $\bar{s} > 0.5$.

The following formulas are now inserted for the identification algorithm:

$$b_c = a_0 \frac{1}{V_R} (V_F - V_R) \text{ if } \bar{s} < 0.5$$

$$b_c = a_1 + a_2 (V_F - V_R) + a_3 \frac{V_R}{V_F - V_R} \text{ if } \bar{s} > 0.5$$

where the parameters $a_0 \ldots a_3$ are determined by the identification, and these are as follows:

$a_0 = \epsilon$
$a_1 = \mu_0$
$a_2 = \mu_0 A \lambda$ $$a_3 = -\frac{\mu_0^2}{4\epsilon}$$

Identification algorithm

In the algorithm, the discrete solution of the differential equation of the wheel is the point of departure:

$$V_R(k+1) = \alpha_1' V_R(K) + \alpha_2' F_A(K) \frac{V_F(K) - V_R(K)}{V_R(K)} \Delta T +$$

$$\alpha_3' P_B(K) \cdot \frac{R \cdot \Delta T}{I_R} \text{ if } \bar{s} < 0.5$$

$$V_R(k+1) = \alpha_1 V_R(K) + [\alpha_2 + \alpha_3\{V_F(K) - V_R(K)\}] F_A(K) \cdot \Delta T +$$

$$\alpha_4 \frac{V_R(K) \cdot F_A(K) \cdot \Delta T}{V_F(K) - V_R(K)} + \alpha_5 P_B(K) \cdot \frac{R \cdot \Delta T}{I_R} \text{ if } \bar{s} > 0.5$$

$\alpha_1 - \alpha_5$ are coefficients that are to be estimated.

The values of $V_R(K)$, $V_F(K)$, $P_B(K)$ and $F_A(K)$ are obtained from measurements by filtering. This filtering will be described later. The identification is effected iteratively and recursively. The counter K counts the recursion steps. The time between iterations is $\Delta T$ and constant. Thus $V_R(K+1)$ is the wheel speed at time $t = (K+1) \cdot \Delta T$.

The algorithm will be described below, using the second equation ($\bar{s} \geq 0.5$). For the case where $\bar{s} < 0.5$, the algorithm takes quite a similar course. The transition of the algorithm from the first to the second equation, and vice versa, will be described later.

If the following values are set thusly:

$A_1 = V_R(K)$
$A_2 = F_A(K) \Delta T$
$A_3 = F_A(K) \cdot \Delta T \cdot \{V_F(K) - V_R(K)\}$ $$A_4 = F_A(K) \cdot \Delta T \cdot \frac{V_R(K)}{V_F(K) - V_R(K)}$$

$A_5 = P_B(K) \cdot R \cdot \Delta T / I_R$ and if $A_1 \ldots A_5$ and $\alpha_1 \ldots \alpha_5$ are considered to be vectors, then the following equation applies:

$$V_R(K+1) = A(K) \cdot \alpha + \nu(K)$$

where $\nu(K)$, because of measurement noise and model error, balances out the error between the prediction $A(K) \cdot \alpha$ and the "measurement" $V_R(K+1)$ where $A(K) \cdot \alpha$ corresponds to a prediction or estimated value $V_R(K+1)$.

In the identification, the sum of the square of the error $$\sum_{i=1}^{k} \nu(i)^2$$

is minimized.

Various methods have been used for solving this problem, such as recursive maximum likelihood, the model reference method, Kalman estimation and estimation of the square root. These and other methods are applicable and have their specific advantages and disadvantages. The ladder algorithms, in particular, appear promising, because they are capable of following along with rapid parameter changes.

The square root method will be used as an example below (see Bierman: Square Root Information Filter, or SRIF for short). This method is given preference here because in this method the corrections in the parameter values $a_i$, $i = 1-5$, per iteration can be weighted. Parameters which are known a priori to vary only slightly are weighted differently from parameters known to be capable of varying greatly. A further advantage of the SRIF method is that a residual analysis is simpler than in other methods. This is important if a decision must be made as to whether the wheel slip is in the linear or nonlinear range of the slip curve, or whether rapid parameter changes are taking place. A quite essential feature of the SRIF method is the accuracy of the parameter determination and the stability of the algorithm. The algorithm makes use of Householder's orthogonal transformations for transforming from the information matrix $\Sigma A^T(i) A(i)$ to a triangular matrix. Accordingly, solving for $\underline{a}$ is quick and unproblematic. The algorithm is sketched in FIG. 2 in the form of a block circuit diagram. The vector $\underline{A}'$ is initialized for $K = o$, with $\underline{A}'(o)$, which is an estimate of the parameter values. It should be noted that $\underline{A}'$ is the vector $\underline{A}$ expanded by the "measured value" $V_R(K+1)$; that is, $A'_1 = A_1$, $A'_2 = A_2$, ... $A'_5 = A_5$, $A_6 = V_R(K+1)$. The triangular matrix $U_o$ is selected as a diagonal matrix, and the value $U_{ojj}$, where $j = 1.5$, are selected such that the individual parameters are suitably valued. In this manner, the weighting of the individual parameter changes already mentioned above can be performed.

Figure 2:
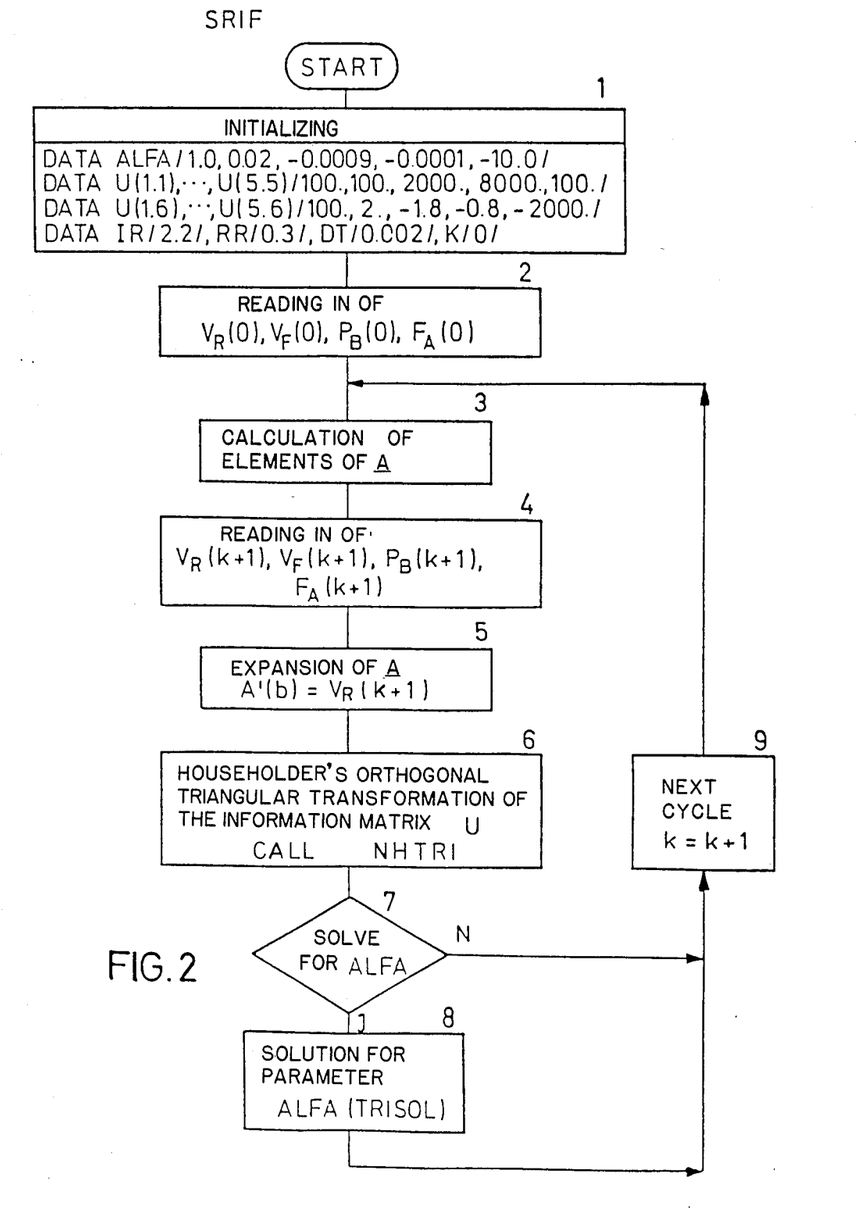
FIG. 2 sets forth a program for carrying out the method.

In FIG. 2, the program is initialized in 1. In line 1, estimated values are given for the parameters $a_1 \ldots a_5$. In line 2, the above-mentioned weighting is set. In line 3, the product of lines 1 and 2 is given. These are accordingly estimated values of the measurements. In the fourth line, the wheel inertia (IR), the tire radius (RR), the time cycle ($\Delta T$) and the time counter are set forward. In 2, initial values for the wheel speed ($V_R$), vehicle speed ($V_F$), the pressure in the wheel brake cylinder $P_B$ and the tire/road contact force ($F_A$) are read in. In 3, new values for A(1)–A(5) are calculated. In 4, new values for $V_R$, $V_F$, $P_B$ and $F_A$ are taken from the above-mentioned filter and the new filtered value of the wheel speed $V_R$ is appended in 5 to the vector $\underline{A}$. With the information matrix U and the "measured vector" $\underline{A}'$, the orthogonal transformation is performed in 6. After the triangular conversion of U, this matrix is already in the form in which the NHTRI routine needs it. In 7, it can be decided whether the new parameter values $a_1 \ldots a_5$ should be calculated, or whether the next "measured values" should be processed immediately. In 8, the TRISOL routine is called up for calculating $a_1 \ldots a_5$. For the next iteration cycle, the time counter is incremented, and the calculation of $\underline{A}$ in 3 starts the new cycle.

Already having been placed under continuous regulation, the variables $V_R(K)$, $V_F(K)$, $PB(K)$ and $FA(K)$ are continuously measured or ascertained and fed into the computer. By combining them with previous information from foregoing measurement and calculation cycles, a further minimizing of the square of the error is performed, which enables an improved estimation of the coefficients $\alpha_n$. From these $\alpha_n$, the coefficient $a_n$ of the $\mu$ slip curve can be ascertained in accordance with the following relationships:

$$a_0 = \alpha_2' \frac{I_R}{R^2}$$

$$a_1 = \alpha_2 \frac{I_R}{R^2}$$

$$a_2 = \alpha_3 \frac{I_R}{R^2}$$

$$a_3 = \alpha_4 \frac{I_R}{R^2}$$

From the calculated values of $\alpha_n$ and $a_n$, the slip curve and the values $$\mu_o = \alpha_2 \cdot I_R/R^2$$

$$A\lambda = \alpha_3/\alpha_2$$

$$\epsilon = -\alpha_2 \cdot \mu_o/(4 \cdot \alpha_4)$$

can now be determined. Once the $\mu$ slip curve is known, then $\lambda$ can be optimally defined.

Shifting the Algorithm into the Two S Ranges

As already described, the slip curve is divided into two ranges: a virtually linear range ($\bar{s} < 0.5$) and a nonlinear range ($\bar{s} \geq 0.5$).

If the wheel slip is located in the linear range, $A\lambda$ and $\mu_o$ cannot be estimated. Thus, in the linear range, $\bar{s}$ cannot be calculated. If the wheel slip is located in the nonlinear range, then $\mu_o$, $A\lambda$ and $\epsilon$ can be estimated, and $\bar{s}$ can be calculated from these values. If the wheel slip drops out of the nonlinear range to below $\bar{s} = 0.5$, then a shift is made to the linear algorithm.

For shifting the linear algorithm to the nonlinear algorithm, several criteria can be used.

Figure 3:
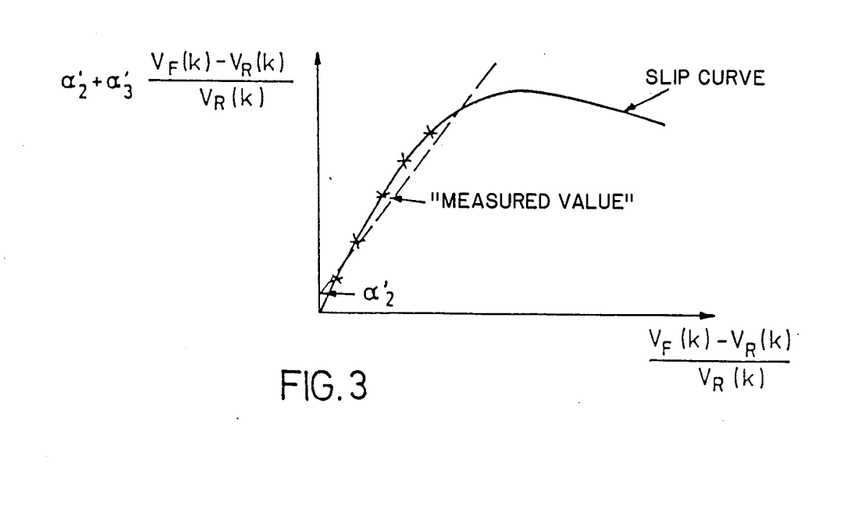
FIGS. 3 and 4 illustrates different algorithms for shifting from a linear algorithm to a nonlinear algorithm shown in block form.

1. The following statement is used $$V_R(K+1) = \alpha_1' \cdot V_R(K) + \left[ \alpha_2' + \alpha_3' \frac{V_F(K) - V_R(K)}{V_R(K)} \right] F_A(K) \cdot \Delta T + \alpha_4' \cdot P_B(K) \cdot \frac{R \cdot \Delta T}{I_R}$$

and the value of $\alpha_2'$ relative to the value of $$\alpha_3' \frac{V_F(K) - V_R(K)}{V_R(K)}$$

is observed. For instance, if $\alpha_2'$ exceeds the value of $$0.1 \cdot \alpha_3' \cdot \frac{V_F(K) - V_R(K)}{V_R(K)},$$

then a shift to the nonlinear algorithm is made. See FIG. 3.

Figure 4:
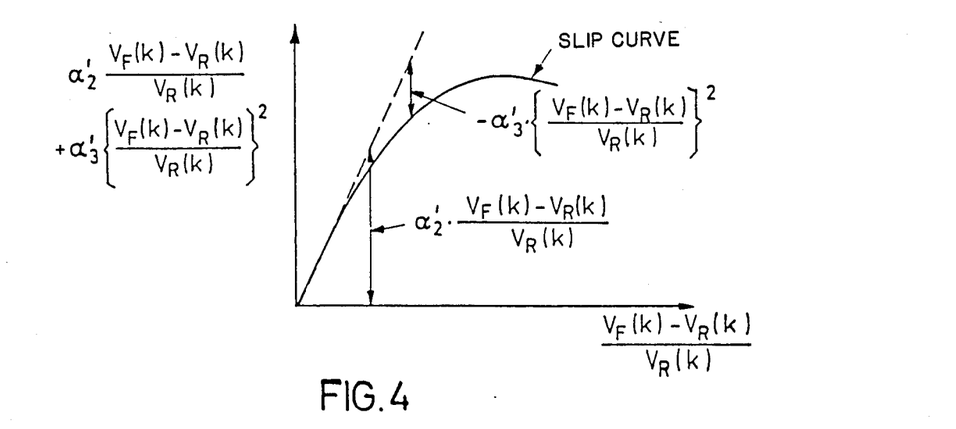

2. The following statement is used $$V_R(K+1) = \alpha_1' \cdot V_R(K) + \left[ \alpha_2' \frac{V_F(K) - V_R(K)}{V_R(K)} + \alpha_3' \left( \frac{V_F(K) - V_R(K)}{V_R(K)} \right)^2 \right] F_A(K) + \alpha_4' \cdot P_B(K) \cdot \frac{R \cdot \Delta T}{I_R}$$

and the value of $$\alpha_3' \left( \frac{V_F(K) - V_R(K)}{V_R(K)} \right)^2$$

relative to the value of $$\alpha_2' \frac{V_F(K) - V_R(K)}{V_R(K)}$$

is observed. If $$-\alpha_3' \cdot \left( \frac{V_F(K) - V_R(K)}{V_R(K)} \right)^2$$

exceeds the value of $$0.1 \cdot \alpha_2' \cdot \frac{V_F(K) - V_R(K)}{V_R(K)},$$

for instance, then a shift to the nonlinear algorithm is made. See FIG. 4:

3. A residual analysis is performed. After each loop, the SRIF method furnishes the minimum error (residual) of the curve (line) from the measurement. If as slip increases, this residual becomes greater and greater and if it exceeds a threshold value, then a shift to the nonlinear algorithm is made.

Finally, it should also be noted that at the outset of braking, the slip is located in the linear range, and that the identification thereof begins with the linear algorithm.

It is also possible for the function $V_R(K+1)$ to be formulated in accordance with the following statement:

$$V_R(k+1) = a_1 \cdot V_R(K) + [a_2 + a_3 \cdot \{V_F(K) - V_R(K)\}]F_A(K) \cdot \Delta T + a_4 \frac{V_R(K)}{V_F(K) - C \cdot V_R(K)} F_A(K) \cdot \Delta T + a_5 \cdot P_B(K) \frac{R \cdot \Delta T}{I_R}$$

C must be chosen skillfully here (e.g., 0.98). In this statement, the division in half (for $\bar{s} \geq$ or $\bar{s} <$) is omitted.

Here, the $\mu$ slip curve $b_c$ is then approximated as well, by means of an expression as follows:

$$b_c = a_1 + a_2 \cdot (V_F - V_R) + a_3 \frac{V_R}{V_F - C \cdot V_R} \text{ for all } \bar{s}.$$

The factor C is selected such that at low slip values, the most recent approximation deviates only slightly from the first approximation. For example, the factor C=0.98 is used.

The procedure is the same as above, except that now, recognizing the exceeding of the maximum is no longer necessary. The coefficients $a_n$ are obtained from the coefficients $\alpha_n$ as follows:

$$a_1 = \alpha_2 \frac{I_R}{R^2}$$

$$a_2 = \alpha_3 \frac{I_R}{R^2}$$

$$a_3 = \alpha_4 \frac{I_R}{R^2}$$

Measurements

If the measured values for $V_R$, $V_F$ and $P_B$ are noisy, or if measured values for $V_F$ and $P_B$ are not even available, then they are estimated in a Kalman filter. In any event, however, the wheel speed must be measured. If the vehicle speed is not measured, then $V_F$ can be estimated from the slip curve and filtered in the Kalman filter. If the pressure in the wheel brake cylinder is not measured, then $p_H$, that is, the pressure in the main brake cylinder, must be measured, and the pressure with which the brake fluid flows back to the return feed pump must be known.

Estimating $V_F$

Once identification using the measurement $V_R(K+1)$ has furnished new values for the parameters of the slip curve, $V_F$ is calculated as an a posteriori value as follows:

$$\bar{s} < 0.5: V_F(K) = V_R(K) + \frac{V_R(K)\{V_R(K+1) - \alpha'_1 V_R(K)\}}{\alpha_2}$$

$$\bar{s} > 0.5: V_F(K) = V_R(K) +$$

$$\frac{-(\alpha_2 - x) \pm \sqrt{(\alpha_2 - x)^2 - 4\alpha_3\alpha_4 V_R(K)}}{2 \cdot \alpha_3}$$

where $x = \dfrac{\alpha_2 \cdot A(2) + \alpha_3 \cdot A(3) + \alpha_4 \cdot A(4)}{F_A(K) \cdot \Delta T}$ The sign before the square root is positive (+) if $\mu_x(K) - \mu_x(K-1) > 0$ and negative (−) if $\mu_x(K) - \mu_x(K-1) \geq 0$ where $$\mu_x(K) = \alpha_2 = \alpha_3 \{\widetilde{V}_F(K) - V_R(K)\} + \alpha_4 \frac{V_R(K)}{\widetilde{V}_F(K) - V_R(K)}$$

and where $\overline{V}_F(K)$ is the vehicle speed predicted by the Kalman filter.

Figure 5:
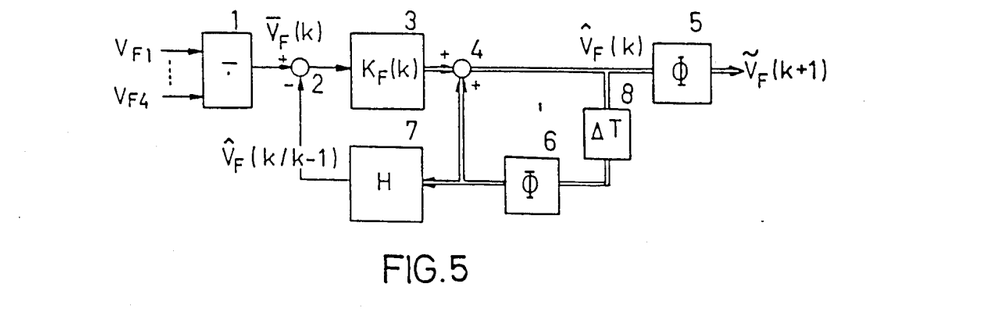
FIG. 5 illustrates a system for an averaging vehicle speed values which are delivered to the Kalman filter.

For every slip curve identified, an estimate of the vehicle speed at four wheels, that is $V_{F1}, \ldots V_{F4}$. After averaging, $$\overline{V}_F(K) = \frac{(V_{F1} + V_{F2} + V_{F3} + V_{F4})}{4} K$$

these four values are delivered to the Kalman filter for the vehicle speed (FIG. 5).

The Kalman filter for the vehicle speed is based on the following differential equations:

$$\dot{V}_F = B$$

$$\dot{b} = w$$

where b is the vehicle deceleration and w is white noise.

The discrete solution of these differential equations is:

$$\begin{vmatrix} V_F(K+1) \\ b(K+1) \end{vmatrix} = \Phi \begin{vmatrix} V_F(K) \\ b(K) \end{vmatrix} + \Gamma \cdot w$$

where the transition matrix is $$\Phi = \begin{vmatrix} 1 & \Delta T \\ 0 & 1 \end{vmatrix}$$

and the noise transition vector is $$\Gamma = \begin{vmatrix} \tfrac{1}{2} \Delta T^2 \\ \Delta T \end{vmatrix}$$

The equation for the measurement is:

$$V_F(K+1) = H \cdot \begin{vmatrix} V_F(K+1) \\ b(K+1) \end{vmatrix} + \nu$$

where the measured vector H=[1 0] and $\nu$ is white noise.

The Kalman filter for the vehicle speed is shown in FIG. 5. In 1, the four vehicle speeds $V_{F1} \ldots V_{F4}$ are averaged. In 2, the predicted value $\hat{V}_F(K|K-1)$ is subtracted from this mean value and the difference is multiplied by 3 by the Kalman amplification factor $K_F(K)$. In 4, the correction at the output of 3 is added to the prediction of the status at the output of 6. The sum is the filtered status, indicated by $V_F(K)$. In 5, the filtered status is multiplied by the transition matrix, and the predicted status, indicated by $V_F(K-1)$, is available at the output of 5. For the next filter cycle, the filtered status in 8 is delayed by a clock cycle and is multiplied in 6 by the transition matrix $\Phi$. In 7, this output of 6 is multiplied by the measured vector H and the prediction of the new mean value $\hat{V}_f(K|K-1)$ is now available at the output of 7.

The Kalman amplification factor can be stored in memory or calculated during the identification process. The calculation of k(K) is indicated in a flow chart in FIG. 6.

Figure 6:
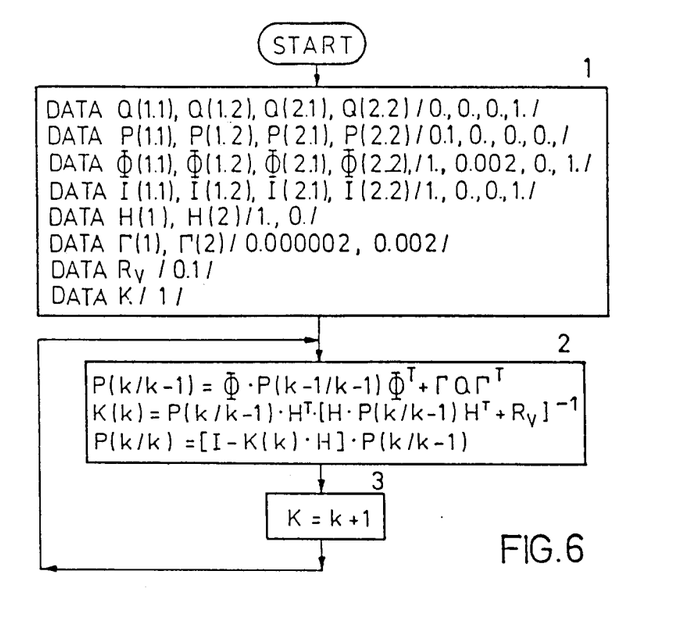
FIG. 6 illustrates a flow chart for identification of Kalman amplification factors stored in memory.

In 1, the algorithm is initialized. In the first line, the variance matrix of the process distortions is shown. The the covariance matrix of the status is shown in the second line. In the third line, the transition matrix is given, and in the fourth line the identity matrix is shown. Lines 5 and 6 indicate the measured vector and the distortion transition vector, respectively.

In line 7, the variance in the measurement noise is defined, and in line 8, the time counter is initialized. In 2, the matrix $P(K|k-1)$, the Kalman amplification vector $k(K)$ and the matrix $P(K|k)$ are calculated in succession. After these calculations have been completed, the time counter is incremented (in 3) and the calculations of 2 are repeated for the new identification loop.

Figure 7:
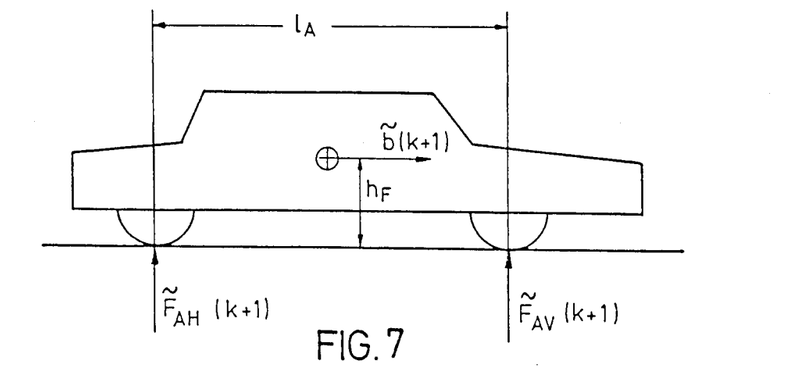
FIG. 7 sets forth calculations for dynamic changes in axle load of a vehicle shown.

From the value $\tilde{b}(K+1)$, the value for $\tilde{F}_A(K+1)$ can now be calculated. It should be noted here that because of the vehicle acceleration (or deceleration), dynamic changes in axle load occur. For the front wheels, the following equation applies (FIG. 7):

$$\tilde{F}_{AV}(K+1) = F_{AOV} - \tfrac{1}{2} \cdot m_F \tilde{b}(K+1) h_F / l_A$$

where $F_{AOV}$ is the static front wheel load,
$m_F$ is the vehicle mass,
$h_F$ is the height of the center of gravity above the road, and
$l_A$ is the wheel base.

For the rear wheels, the following equation applies:

$$\tilde{F}_{AH}(k+1) = F_{AOH} + \tfrac{1}{2} \cdot m_F \tilde{b}(K+1) \cdot h_F / l_A$$

where $F_{AOH}$ is the static rear wheel load.

Estimating $V_R$ and $P_B$

The Kalman filter for the wheel speed and the braking pressure is based on the following differential equations:

$$\dot{V}_R = -C_B \cdot P_B + M_R$$

$$\dot{M}_R = w$$

$$\dot{P}_B = C_o \cdot (p_o(t) - p_B) + C_1 \cdot w$$

where $C_B$ and $C_I$ are constants, and $p_o$ and $C_o$ are dependent on the status of the switching valve (FIG. 1); w is the process distortion.

The discrete solution of these differential equations is $$\begin{vmatrix} V_R(K+1) \\ M_R(K+1) \\ P_B(K+1) \end{vmatrix} = \Phi \cdot \begin{vmatrix} V_R(K) \\ M_R(K) \\ P_B(K) \end{vmatrix} + \Gamma_1 \cdot P_o(K) + \Gamma_2 \cdot w(K)$$

where the transition matrix is $$\Phi = \begin{vmatrix} 1 & \Delta T & -\dfrac{C_B}{C_o}(1 - e^{-c_o \Delta T}) \\ 0 & 1 & 0 \\ 0 & 0 & e^{-c_o \Delta T} \end{vmatrix}$$

the regulation transition vector is $$\Gamma_1 = \begin{vmatrix} \dfrac{C_B}{C_o} \{1 - c_o \cdot \Delta T - e^{-c_o \Delta T}\} \\ 0 \\ 1 - e^{-c_o \Delta T} \end{vmatrix}$$

and the distortion transition vector is $$\Gamma_2 = \begin{vmatrix} \tfrac{1}{2} \cdot \Delta T^2 + \dfrac{C_1 \cdot C_B}{C_o^2} \{1 - C_o \cdot \Delta T - e^{-C_o \Delta T}\} \\ \Delta T \\ \dfrac{C_1}{C_o}(1 - e^{-c_o \Delta T}) \end{vmatrix}$$

$C_o$, $C_I$ and $C_B$ are constants, which may have preselected values. It should be noted that $C_o$ might be different for pressure buildup and for pressure reduction. The Kalman filtering takes a course similar to that described under the heading of $V_F$ estimation.

In the invention, by measuring the wheel speed and perhaps the pressure in the main or wheel brake cylinder and evaluating them, the entire slip curve, within the range that is of interest (i.e., around the optimum), is determined. Recognizing the slip curve enables the regulator to regulate the wheel speed in accordance with selectable points on the slip curve. Thus yawing moments could be kept under control, and a flexible compromise between braking distance on the one hand and steerability and stability on the other could be attained.

We claim:

1. A method for determining an optimal slip value $\lambda$ at at least one wheel of a vehicle for regulating braking force, using signals ($V_R^*$; $V_F$) at least approximated to the wheel speed $V_R$ and the vehicle speed $V_F$, characterized in that the method comprises during driving, varying the slip value $\lambda$ by varying the braking pressure $P_B$ and at individual measuring instants (K, K+1 ... ) and ascertaining signal value combinations $V_R^*(K)$, $V_F^*(K)$, $P_B^*(K)$ and $F_A^*(K)$, that after inserting a plurality of these ascertained signal value combinations for various values of slip value $\lambda$ into a function $V_R(K+1) = f$ with unknown estimated coefficients $a_n$, solving the resultant equation system and ascertaining the coefficients $a_n$, ascertaining coefficients $a_n$ which are coefficients of a generalized description of a $\mu$ slip curve $\mu = f(V_R, V_F)$ from the coefficients $a_n$, and ascertaining a location of the optimal slip value $\lambda_{opt}$ by use of the ascertained instantaneous course of the $\mu$ slip curve, where $p_B(K)$ is the braking pressure, $F_A(K)$ is the tire/road contact force and K is an increment counter, which defines the measurement and calculation instances which are located at intervals of $\Delta T$ from one another, and obtaining function $V_R(K+1)$ by the following two expressions:

$$V_R(K+1) = \alpha'_1 V_R(K) + \alpha'_2 \cdot F_A(K) \cdot \frac{V_F(K) - V_R(K)}{V_R(K)} \cdot \Delta T +$$

$$\alpha'_3 P_B(K) \frac{R \cdot \Delta T}{I_R} \bar{s} < 0.5$$

$$V_R(K+1) = \alpha_1 \cdot V_R(K) + [\alpha_2 + \alpha_3 (V_F(K) - V_R(K))] \cdot$$

$$F_A(K)\Delta T + \alpha_4 \frac{V_R(K) \cdot F_A(K) \cdot \Delta T}{V_F(K) - V_R(K)} + \alpha_5 P_B(K) \frac{R \Delta T}{I_R}$$

for $\bar{s} > 0.5$, where $\alpha'_1$ and $\alpha'_2$ and $\alpha_1-\alpha_5$ are the coefficients $\alpha_n$ that are to be ascertained, R is the radius of the wheel, IR is its moment of inertia, $$\bar{s} = \frac{\epsilon \lambda}{\mu(1-\lambda)},$$

$\epsilon$ is a tire constant, $\mu = \mu_o(1 + A\lambda.\nu\lambda)$, $\mu_o$ is the coefficient of friction between the tire and the road, $A\lambda$ is a rubber constant and $\nu\lambda = \lambda.V_F$.

2. A method as defined by claim 1, in which $\mu$ slip curve is described by the following expression:

$$\mu = a_0 \frac{1}{V_R} (V_F - V_R) \bar{s} < 0.5$$

$$\mu = a_1 + a_2(V_F - V_R) + a_3 \frac{V_R}{V_F - V_R} \bar{s} > 0.5.$$

3. A method as defined by claim 1, characterized in that the $\mu$ slip curve is described by the following expression for all values of $\bar{s}$:

$$\mu = a_1 + a_2(V_F - V_R) + a_3 \frac{V_R}{V_F - CV_R}$$

4. A method as defined by claim 1, 2 or 3 characterized in that the parameters $\alpha_n$ of the function $V_R(K+1)$ are obtained from the expression $$\bar{V}_R(K+1) = \hat{V}_R(K+1) + v(k)$$

by minimizing the sum of the square of the error $$\sum_{i=1}^{K} (v_i)^2 = \text{Min}$$

where $\bar{V}_R(K+1)$ is a measured value, $\hat{V}_R(K+1)$ is an estimated value and $v(K)$ is an approximation error.

5. A method as defined by claim 1 or 2, characterized in that the nonlinear expression $V_R(K+1)$ for $\bar{s} \geq 0.5$ is taken into consideration if from the comparison of predetermined variable values, it can be concluded that a departure from the approximately linear range $\bar{s} < 0.5$ has been made.

6. A method as defined by claim 1, 2, or 3, characterized in that the noisy measured values $V_R$, $V_F$, $F_A$ and $p_B$ are ascertained by means of a Kalman filter.

7. A method as defined by claim 1, 2, or 3, characterized in that the values $V_F$, $F_A$ and $p_B$ are estimated from the measured value for $V_R$ or from the estimated measured value $V_R$, at least partially by means of a Kalman filter.

8. A method as defined by claim 1, characterized in that the parameters $\alpha_n$ of the function $V_R(K+1)$ are obtained from the expression $$\bar{V}_R(K+1) = \hat{V}_R(K+1) + v(K)$$

by minimizing the sum of the square of the error $$\sum_{i=1}^{K} v(i)^2 = \text{Min}$$

where $\bar{V}_R(K+1)$ is a measured value, $\hat{V}_R(K+1)$ is an estimated value and $v(K)$ is an approximation error, and the nonlinear expression $V_R(K+1)$ for $\bar{s} \geq 0.5$ is taken into consideration if from the comparison of predetermined variable values, it can be concluded that a departure from the approximately linear range $\bar{s} < 0.5$ has been made.

9. A method as defined by claim 8, characterized in that the noisy measured values $V_R$, $V_F$, $F_A$ and $P_B$ are ascertained by means of a Kalman filter.

10. A method as defined by claim 8, characterized in that the values $V_F$, $F_A$ and $P_B$ are estimated from the measured value for $V_R$ or from the estimated measured value $V_R$, at least partially by means of a Kalman filter.

11. A method for determining an optimal slip value $\lambda$ at at least one wheel of a vehicle for regulating braking force, using signals $(V_R^*; V_F)$ at least approximated to the wheel speed $V_R$ and the vehicle speed $V_F$, characterized in that the method comprises during driving, varying the slip value $\lambda$ by varying the braking pressure $P_B$ and at individual measuring instants $(K, K+1 \ldots)$ and ascertaining signal value combinations $V_R^*(K)$, $V_F^*(K)$, $P_B^*(K)$ and $F_A^*(K)$, that after inserting a plurality of these ascertained signal value combinations for various values of slip value $\lambda$ into a function $V_R(K+1) = f$ with unknown estimated coefficients $a_n$, solving the resultant equation system and ascertaining the coefficients $a_n$, ascertaining coefficients $a_n$ which are coefficients of a generalized description of a $\mu$ slip curve $\mu = f(V_R, V_F)$ from the coefficients $a_n$, and ascertaining a location of the optimal slip value $\lambda_{opt}$ by use of the ascertained instantaneous course of the $\mu$ slip curve, where $p_B(K)$ is the braking pressure, $F_A(K)$ is the tire/road contact force and K is an increment counter, which defines the measurement and calculation instances which are located at intervals of $\Delta T$ from one another, and obtaining function $V_R(K+1)$ by the following expression:

$$V_R(K+1) = a_1 V_R(K) + [a_2 + a_3(V_F(K) - V_R(K)] \cdot F_A(k) \cdot$$

$$\Delta T + \frac{a_4 \cdot V_R(K)}{V_F(K) - C V_R(K)} \cdot F_A(K) \cdot \Delta T +$$

$$a_5 P_B(K) \frac{R \Delta T}{I_R}$$

where $a_1-a_5$ are the constants $a_n$ that are to be ascertained, R is the radius of the wheel, IR is its moment of inertia and C is a constant (e.g., 0.98).

12. A method for determining an optimal slip value $\lambda$ at at least one wheel of a vehicle for regulating braking force, using signals $(V_R^*; V_F)$ at least approximated to the wheel speed $V_R$ and the vehicle speed $V_F$, characterized in that the method comprises during driving, varying the slip value λ by varying the braking pressure $P_B$ and at individual measuring instants (K,K+1 ...) and ascertaining signal value combinations $V_R*(K)$, $V_F*(K)$, $P_B*(K)$ and $F_A*(K)$, that after inserting a plurality of these ascertained signal value combinations for various values of slip value λ into a function $V_R(K+1)=f$ with unknown estimated coefficients $a_n$, solving the resultant equation system and ascertaining the coefficients $a_n$, ascertaining coefficients $a_n$ which are coefficients of a generalized description of a μ slip curve $\mu=f(V_R, V_F)$ from the coefficients $a_n$, and ascertaining a location of the optimal slip value $\lambda_{opt}$ by use of the ascertained instantaneous course of the μ slip curve, where $p_B(K)$ is the braking pressure, $F_A(K)$ is the tire/road contact force and K is an increment counter, which defines the measurement and calculation instances which are located at intervals of ΔT from one another, and the parameters $a_n$ of the function $V_R(K+1)$ are obtained from the expression $$\bar{V}_R(K+1) = V_R(K+1) + \nu(K)$$

by minimizing the sum of the square of the error $$\sum_{i=1}^{K} (\nu_i)^2 = \text{Min}$$

where $\bar{V}_R(K+1)$ is a measured value, $V_R(K+1)$ is an estimated value and $\nu(K)$ is an approximation error, and the noisy measured values $V_R$, $V_F$, $F_A$ and $P_B$ are ascertained by means of a Kalman filter.

13. A method for determining an optimal slip value λ at at least one wheel of a vehicle for regulating braking force, using signals ($V_R*$; $V_F$) at least approximated to the wheel speed $V_R$ and the vehicle speed $V_F$, characterized in that the method comprises during driving, varying the slip value λ by varying the braking pressure $P_B$ and at individual measuring instants (K,K+1 ...) and ascertaining signal value combinations $V_R*(K)$, $V_F*(K)$, $P_B*(K)$ and $F_A*(K)$, that after inserting a plurality of these ascertained signal value combinations for various values of slip values λ into a function $V_R(K+1)=f$ with unknown estimated coefficients $a_n$, solving the resultant equation system and ascertaining the coefficients $a_n$, ascertaining coefficients $a_n$ which are coefficients of a generalized description of a μ slip curve $\mu=f(V_R, V_F)$ from the coefficients $a_n$, and ascertaining a location of the optimal slip value $\lambda_{opt}$ by use of the ascertained instantaneous course of the μ slip curve, where $p_B(K)$ is the braking pressure, $F_A(K)$ is the tire/road contact force and K is an increment counter, which defines the measurement and calculation instances which are located at intervals of ΔT from one another, and the parameters $a_n$ of the function $V_R(K+1)$ are obtained from the expression $$\bar{V}_R(K+1) = \hat{V}_R(K+1) + \nu(K)$$

by minimizing the sum of the square of the error $$\sum_{i=1}^{K} (\nu_i)^2 = \text{Min}$$

where $\bar{V}_R(K+1)$ is a measured value, $\hat{V}_R(K+1)$ is an estimated value and $\nu(K)$ is an approximation error, and the values $V_F$, $F_A$ and $P_B$ are estimated from the measured value for $V_R$ or from the estimated measured value $V_R$, at least partially by means of a Kalman filter.

* * * * *